US009905041B2

United States Patent
Yu

(10) Patent No.: US 9,905,041 B2
(45) Date of Patent: Feb. 27, 2018

(54) DEPTH OF FIELD SYNTHESIS USING RAY TRACING APPROXIMATION

(71) Applicant: Adobe Systems Incorporated, San Jose, CA (US)

(72) Inventor: Zhan Yu, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 108 days.

(21) Appl. No.: 14/551,856

(22) Filed: Nov. 24, 2014

(65) Prior Publication Data

US 2016/0148415 A1   May 26, 2016

(51) Int. Cl.
*G06T 15/06* (2011.01)
*G06T 15/20* (2011.01)
*G06T 15/40* (2011.01)

(52) U.S. Cl.
CPC .......... *G06T 15/06* (2013.01); *G06T 2200/21* (2013.01)

(58) Field of Classification Search
CPC .......... G06T 15/06; G06T 15/20; G06T 15/40
See application file for complete search history.

(56) References Cited

U.S. PATENT DOCUMENTS

| 5,570,433 | A * | 10/1996 | Nagamine | G06T 5/20 250/201.2 |
| 8,493,383 | B1 * | 7/2013 | Cook | G06T 15/06 345/419 |
| 8,791,947 | B1 * | 7/2014 | Kontkanen | G06T 15/20 345/420 |
| 2006/0029270 | A1 * | 2/2006 | Berestov | G06T 7/593 382/154 |
| 2011/0169921 | A1 * | 7/2011 | Lee | H04N 5/23212 348/46 |
| 2011/0227950 | A1 * | 9/2011 | Suzuki | H04N 5/23216 345/661 |
| 2012/0092462 | A1 * | 4/2012 | Li | G02B 27/2221 348/49 |
| 2013/0208093 | A1 * | 8/2013 | Sun | G06T 5/003 348/46 |

OTHER PUBLICATIONS

Cook, et al., "Distributed Ray Tracing," Computer Graphics, vol. 18, No. 3; Jul. 1984. 9 pages.

(Continued)

*Primary Examiner* — Sing-Wai Wu
(74) *Attorney, Agent, or Firm* — Finch & Maloney PLLC

(57) ABSTRACT

Techniques are disclosed for synthesizing depth of field effects in a digital image using ray tracing approximation. For each target pixel in the image, an aperture-shaped kernel is centered about a reference pixel. A cone of rays is traced through the aperture toward the image scene. The trajectory of the rays and the intersections between the rays and objects in the scene are approximated for a given scene depth, focal depth and aperture shape. The color of the pixel lying at the intersection, which may be offset from the target pixel, is sampled. This sampling process is repeated for several apertures bounding the target pixel, where each aperture is centered about a different reference pixel. The resulting color of the target pixel is acquired by integrating the colors of the pixels at each of the resulting intersections.

20 Claims, 10 Drawing Sheets

(56) References Cited

OTHER PUBLICATIONS

GPU Gems 3—Chapter 28. Practical Post-Process Depth of Field. URL: http://http.developer.nvidia.com/GPUGems3/gpugems3_ch28.html. Downloaded from the Internet Nov. 7, 2014. 23 pages.
Haeberli and Akeley, "The Accumulation Buffer: Hardware Support for High-Quality Rendering," Computer Graphics, vol. 24, No. 4, Aug. 1990. 10 pages.
Isaksen, et al., "Dynamically Reparameterized Light Fields," URL: http://www.csbio.unc.edu/mcmillan/pubs/sig00_isaksen.pdf. Downloaded from the Internet Nov. 7, 2014. 10 pages.
Kosloff, et al., Depth of Field Postprocessing for Layered Scenes Using Constant-Time Rectangle Spreading, Electrical Engineering and Computer Sciences, University of California at Berkeley. Technical Report No. UCB/EECS-2008-187. http://www.eecs.berkeley.edu/Pubs/TechRpts/2008/EECS-2008-187.html. Dec. 30, 2008. 10 pages.
Kraus and Strengert, "Depth-of-Field Rendering by Pyramidal Image Processing," Eurographics 2007/ D. Cohen-Or and P. Slavik (Guest Editors), vol. 25 (2007), No. 3. 10 pages.
Lee et al., "Depth-of-Field Rendering with Multiview Synthesis," URL: http://www.intel-vci.uni-saarland.de/fileadmin/grafik_uploads/publications/36.pdf. Downloaded from the Internet Nov. 7, 2014. 6 pages.
Real-Time Lens Blur Effects and Focus Control, URL: http://graphics.tudelft.nl/Publications-new/2010/LES10a/AuthorVersion.pdf. Downloaded from the Internet Nov. 7, 2014. 6 pages.
Levoy and Hanrahan, "Light Field Rendering," Proc. URL: https://graphics.stanford.edu/papers/light/light-lores-corrected.pdf. Downloaded from the Internet Nov. 7, 2014. 12 pages.
Lee, et al., "Real-Time Depth-of-Field Rendering Using Anisotropically Filtered Mipmap Interpolation," IEEE Transactions on Visualization and Computer Graphics, vol. 15, No. 3, May/Jun. 2009. 12 pages.
Ng, Ren, "Fourier Slice Photograph," ACM Transactions on Graphics (TOG)—Proceedings of ACM SIGGRAAPH 2005, vol. 24, Issue 3, Jul. 2005. 10 pages.
Soler, et al., "Fourier Depth of Field," ACM Transactions on Graphics, vol. V., No. N, M 2009. 18 pages.
Yu, et al, "Real-Time Depth of Field Rendering via Dynamic Light Field Generation and Filtering," Pacific Graphics, 2010, P. Alliez, L. Bala and K. Zhou, (Guest Editors), vol. 29 (2010), No. 7. 9 pages.

* cited by examiner

DEPTH OF FIELD SYNTHESIS USING RAY TRACING APPROXIMATION

FIELD OF THE DISCLOSURE

This disclosure relates to the field of digital image processing, and more particularly, to techniques for synthesizing depth of field effects.

BACKGROUND

Depth of field is the distance between the nearest and farthest objects in an image of a scene that appear sharp and clear. By contrast, objects outside of the depth of field appear blurry. In conventional photography, the depth of field is a function of, among other things, the focal length of the camera lens and the f-number of the lens. However, simulated depth of field effects can be synthesized in digitally rendered images using several existing solutions. One existing solution simulates depth of field by tracing and integrating random rays of light sampled on the lens. Such a solution is accurate but slow. Another existing solution uses an accumulation buffer to reorganize rays of light as multiple pinhole cameras on the lens. Each individual camera can then be rendered using rasterization. This technique requires repeated rendering of the scene, which limits its effective speed. Accordingly, there is a need for an improved depth of field synthesis technique.

BRIEF DESCRIPTION OF THE DRAWINGS

The accompanying drawings are not intended to be drawn to scale. In the drawings, each identical or nearly identical component that is illustrated in various figures is represented by a like numeral.

FIG. 2A shows an example digital input image.

FIG. 2B shows an example depth map, in accordance with an embodiment of the present invention.

DETAILED DESCRIPTION

Figure 1:
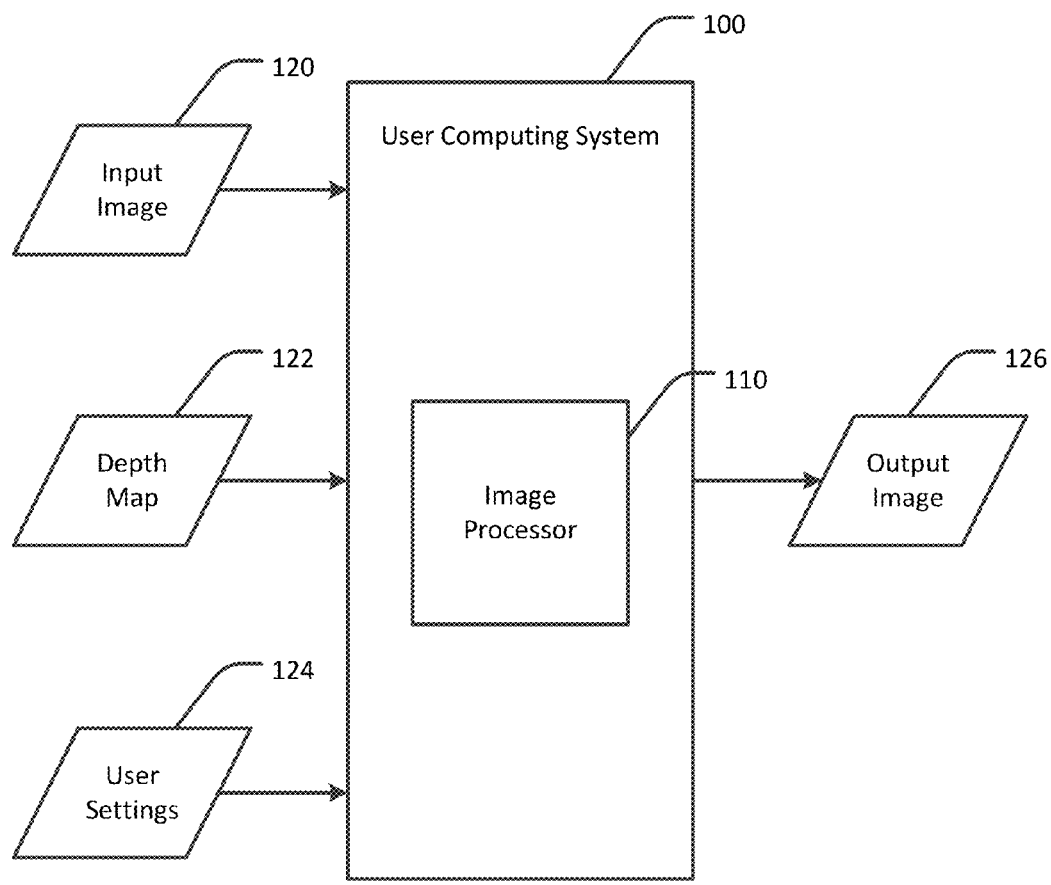
FIG. 1 shows an example user computing system for synthesizing depth of field effects in a digital image, in accordance with an embodiment of the present invention.

In a digital image, a shallow focus around one or more objects of interest in a scene can be created by blurring other regions of the image, which adds a depth of field effect. Some existing solutions approximate depth of field by spatially varying the blurring. The depth of each pixel determines the amount of blur. However, some of these solutions have limited accuracy because the blurring can cross depth boundaries, which creates an unnatural appearance where objects outside of the shallow focus are blurred to a similar extent regardless of their distance from the lens. Some other existing solutions that simulate depth of field effects in real-time perform decomposition of the scene geometry into discrete depth layers, which can lead to rendering artifacts, especially for complex scenes. Yet other existing solutions have very high memory utilization, such as those that simulate depth of field effects in real-time by integrating spatial and angular information in a light field of a two-dimensional sampling plane.

To this end, and in accordance with an embodiment of the present invention, a technique is disclosed for synthesizing depth of field effects in a digital image using ray tracing approximation. For each target pixel in the image, an aperture-shaped kernel is centered about a reference pixel. A cone of rays is traced through the aperture toward the image scene. The trajectory of the rays and the intersections between the rays and objects in the scene are approximated for a given scene depth (e.g., the depth of a given pixel in the aperture), focal depth and aperture shape. The color of the pixel lying at the intersection, which may be offset from the target pixel, is sampled. This sampling process is repeated for several apertures bounding the target pixel, where each aperture is centered about a different reference pixel. The resulting color of the target pixel is acquired by integrating the colors of the pixels at each of the resulting intersections. Numerous configurations and variations will be apparent in light of this disclosure.

As used in this disclosure, the terms "depth," "pixel depth" and "focal depth" refer to a distance between a camera lens and a point on the surface of an object as observed by the camera, or the distance between the lens and an imaginary focal plane in the scene. The camera lens, the object, or both can be real or simulated. In the context of a two-dimensional image of a three-dimensional scene, where the image is formed by a plurality of pixels, the depth of a pixel is the depth of an object surface appearing in the pixel. Different pixels can have different depths, depending on the relative distances between the surfaces displayed by each pixel. For example, the depth of one pixel may be 10 centimeters, and the depth of another pixel may be 20 centimeters. The depth of a given point of the surface of an object in a two-dimensional image is perceptible to the viewer due to the blurring of object surfaces lying outside of the depth of field. Thus, if the depth of field is 5 centimeters and the focal plane lies at a depth of 10 centimeters, a group of pixels having a depth of 20 centimeters may appear out of focus as compared to a group of pixels having a depth of 10 centimeters.

Example System

FIG. 1 shows an example user computing system 100 for synthesizing depth of field effects in a digital image, in accordance with an embodiment. The system 100 includes an image processor 110. The image processor 110 receives, as inputs, a digital input image 120 of a scene, a depth map 122 representing the relative depths of objects in the scene, and various user settings 124 for use in synthesizing the depth of field effects in the digital input image 120. The user settings 124 may include, for example, a user-specified focal depth, aperture shape and aperture size. Using these inputs, the image processor 110 synthesizes depth of field effects for the digital input image 120 to produce a digital output image 126, such as variously described in this disclosure.

FIG. 2A shows an example digital input image 120, and FIG. 2B shows an example depth map 122, in accordance with an embodiment. The input image 120 can be any real (e.g., a photograph) or computer-generated image. The depth map 122 represents the distance of each pixel in the image from a given focal point. For example, darker pixels may represent objects near the focal point, and lighter pixels may represent objects far from the focal point. In some embodiments, the depth map 122 is user-generated (e.g., depth painting). In other embodiments, the depth map 122 is computer-generated (e.g., via depth sensors or computer vision techniques such as multi-view depth estimation). In the case where the image 120 is real, the depth map 122 can be acquired using a depth sensor (e.g., Microsoft Kinect), computer vision techniques (e.g., multi-view depth estimation), or user input (e.g., depth painting). In the case where the image 120 is computer-generated, the depth map 122 can be a byproduct of the rendering process for the image. The alignment of the input image 120 and depth map 122 may affect the quality of the output image 126. To account for this, an automatic alignment algorithm can be applied as a preprocessing step; however, it will be understood that such automatic alignment is not necessary. The color value of each channel of the input image 120 is normalized to 0 and 1. The depth value is also normalized to 0 and 1, where 0 is the closest point in the scene.

Figure 3B:
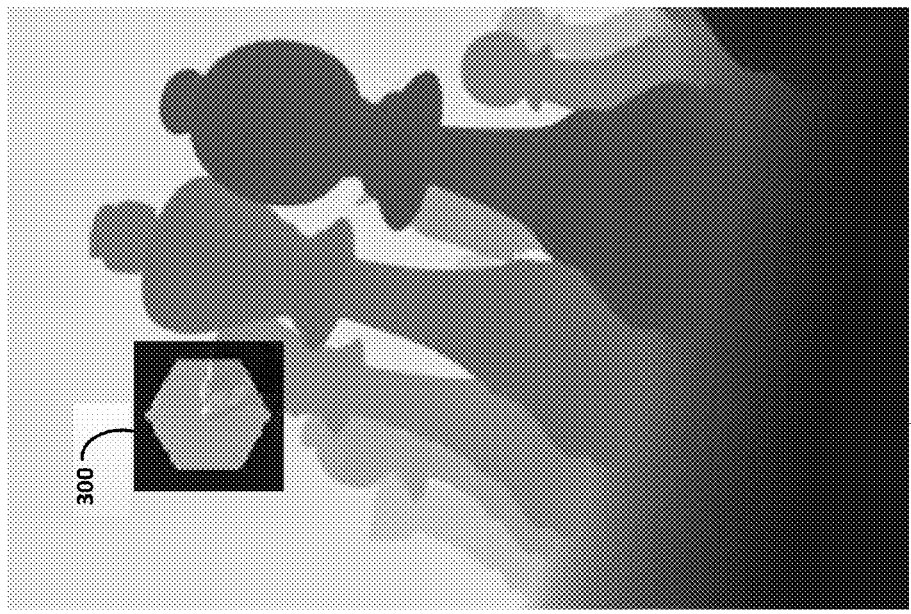
FIG. 3B shows the example depth map of FIG. 2B, with the kernel of FIG. 3A centered over a corresponding pixel in the depth map, in accordance with an embodiment of the present invention.
Figure 3A:
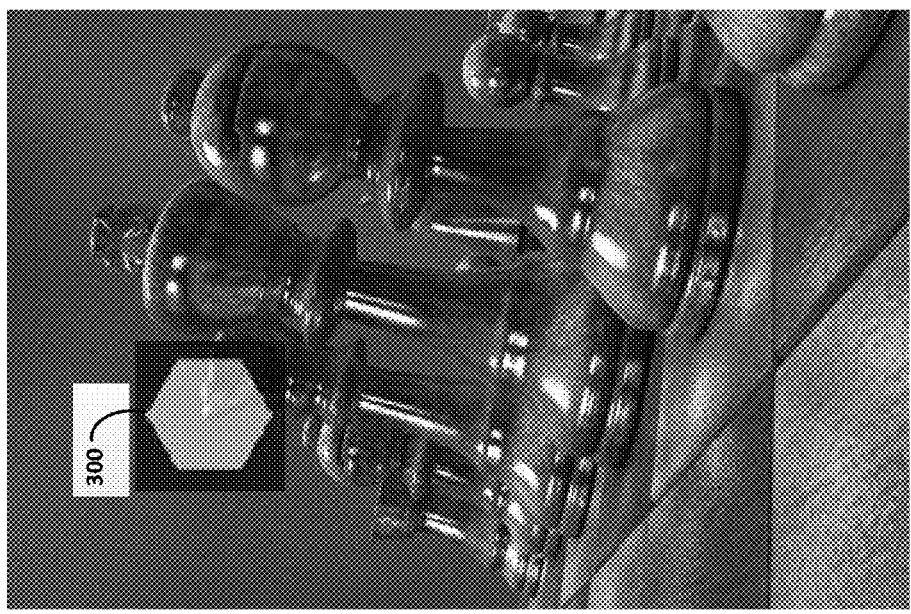
FIG. 3A shows the example digital input image of FIG. 2A, with an example kernel centered about one pixel in the image, in accordance with an embodiment of the present invention.

FIG. 3A shows the example digital input image 120 of FIG. 2A, with an example user-defined, aperture-shaped kernel 300 centered about one reference pixel in the image, in accordance with an embodiment. FIG. 3B shows the example depth map 122 of FIG. 2B, with the kernel 300 centered over a corresponding reference pixel in the depth map, in accordance with this embodiment. It will be understood that the kernel 300 can be centered about any pixel in the image.

Figure 4:
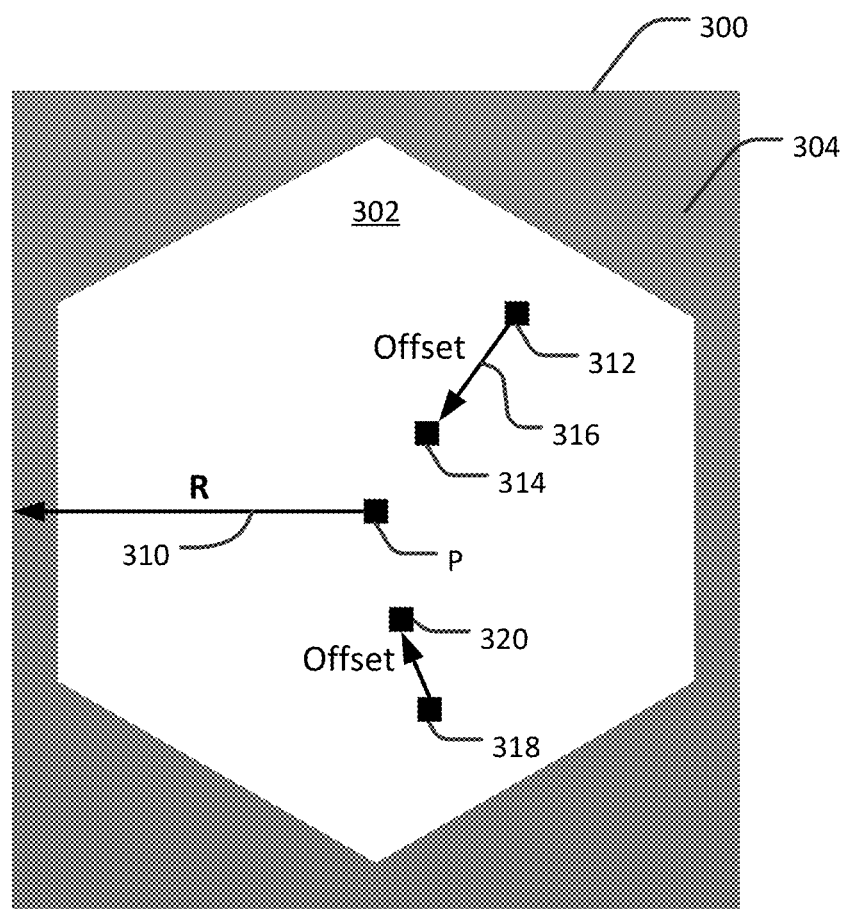
FIG. 4 shows the example kernel of FIGS. 3A and 3B in further detail, in accordance with an embodiment of the present invention.

FIG. 4 shows the example kernel 300 of FIGS. 3A and 3B in further detail, in accordance with this embodiment. The kernel 300 simulates the real aperture of a camera, where the camera lens is centered about any given pixel of the image 120. The kernel 300 is applied to one or more pixels (e.g., all pixels) of the input image 120. The kernel 300 includes the shape of the aperture 302, the size of the aperture and the focal depth. The aperture 302 can have any shape, such as circular or hexagonal. The kernel size is equal to 2R+1, where R is the kernel radius 310. The aperture shape 302 is defined by a binary texture 304. Pixels aligned with black texture elements, or texels, on the binary texture 304 are not used in computing the depth of field effect, whereas pixels aligned with the clear texels within the aperture 302 are used in computing the depth of field effect. The aperture size can be measured in pixel units, and the central pixel of the aperture is aligned with the reference pixel of the input image. The focal depth is any value from 0 to 1, inclusive.

Still referring to FIG. 4, in accordance with an embodiment, the kernel 300 is centered over any reference pixel P of the input image 120. The aperture of the kernel 300 is also centered over a corresponding pixel of the depth map 122. As described in further detail below, the aperture is used to sample one region of the input image 120, centered about each reference pixel P, to render an output image with synthesized depth of field effects. When the kernel 300 is moved to a different reference pixel P in the input image 120, the kernel also moves to a corresponding pixel in the depth map 122; that is, the image and the depth map are pixel-wise aligned.

Some existing image-based depth of field synthesis (blurring) techniques cause boundary bleeding and discontinuity artifacts. This is because the blur kernel is different at different depths, which prevents some pixels from being sampled. If such pixels are ignored, the sampling becomes non-uniform across the final image, which can also lead to discontinuity artifacts. To this end, in accordance with an embodiment of the present invention, the scene is assumed to be piecewise smooth; that is, neighboring pixels in the kernel are assumed to have the same depth. Using this assumption, and as described in further detail with respect to FIGS. 5-7, the depth of field effect in a digital image can be synthesized with fewer artifacts using an approximated ray tracing technique, which is based on the desired focal depth and the depth of each pixel in the aperture, such as target pixels 312 or 318 in FIG. 4.

In accordance with an embodiment, to approximate the ray tracing, initially each target pixel 312, 318 within the aperture is considered to have a pseudo-intersection with the surface of an object directly below the pixel. The pseudo-intersection occurs at the depth specified for the pixel 312, 318 by the depth map 122. In other words, the pseudo-intersection lies along a ray traced through the target pixel 312, 318 and toward the surface of the object in the scene along a line perpendicular to the image plane (for the pseudo-intersections, the lens has no effect on the ray). The pseudo-intersection of the ray is equivalent to the true intersection of the ray when the ray is actually perpendicular to the image plane. However, in reality, a camera lens has a finite lens aperture, and therefore a limited depth of field. Thus, a ray traced through the lens may be incident to the object surface at an angle that is not perpendicular to the image plane. To account for this, the sampling position is adjusted from the target pixel 312, 318 to a sample pixel 314, 320 according to the depth of the target pixel (e.g., the depth of the object appearing in the pixel) and the approximated true intersection between the ray and the object surface corresponding to the target pixel 312. For a given target pixel 312, a sample pixel 314 is offset from the target pixel 312 by some distance 316, as determined by the approximated ray. The color sampled from the sample pixel 314 is integrated with the color sampled from other sample pixels to acquire the final color of the target pixel 312. The color of each target pixel 312, 318 is separately computed, and the output image 126 has the same resolution as the input image 120.

Figure 5:
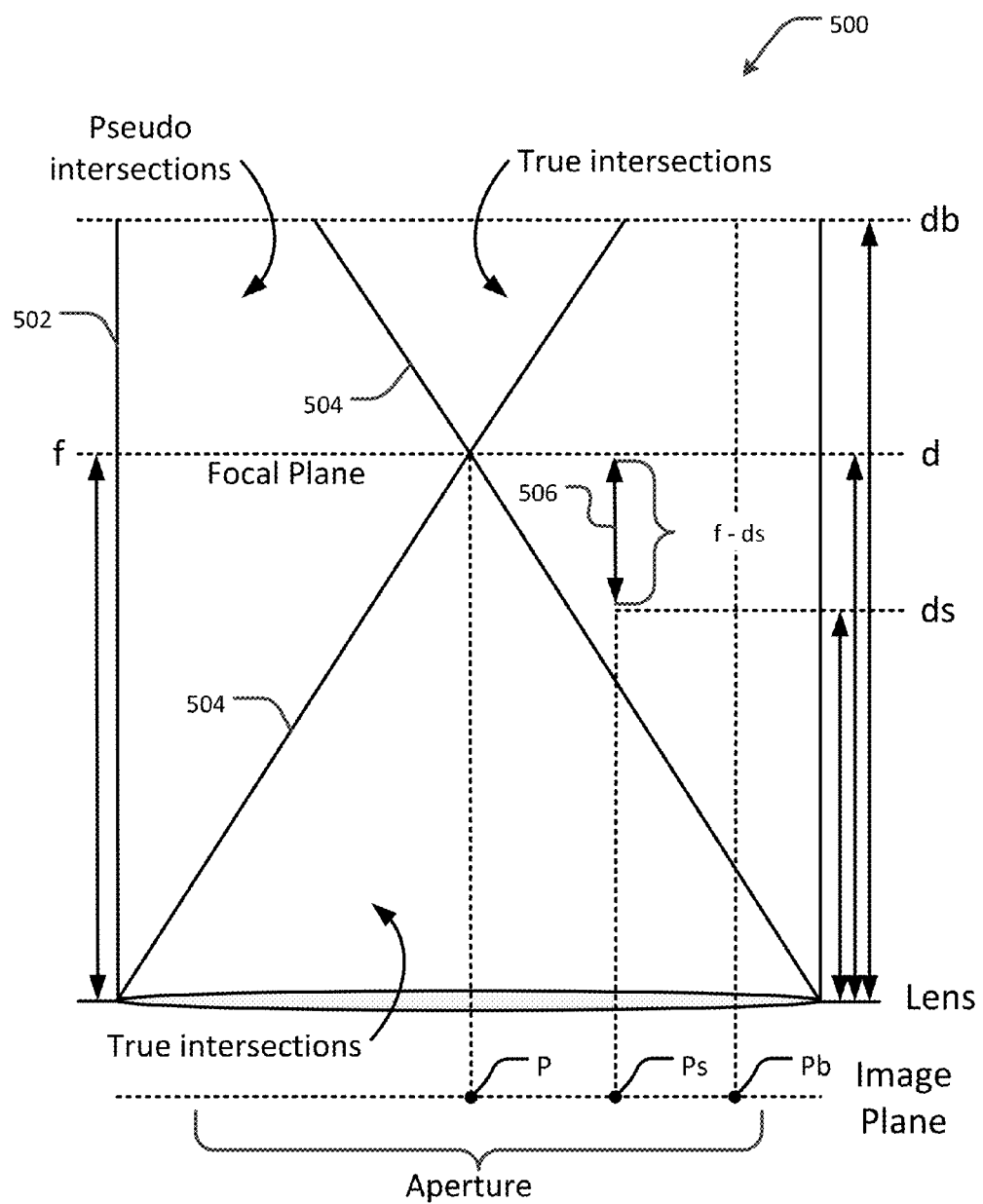
FIGS. 5, 6 and 7 are example ray tracing diagrams for various focal plane depth values, in accordance with embodiments of the present invention.
Figure 6:
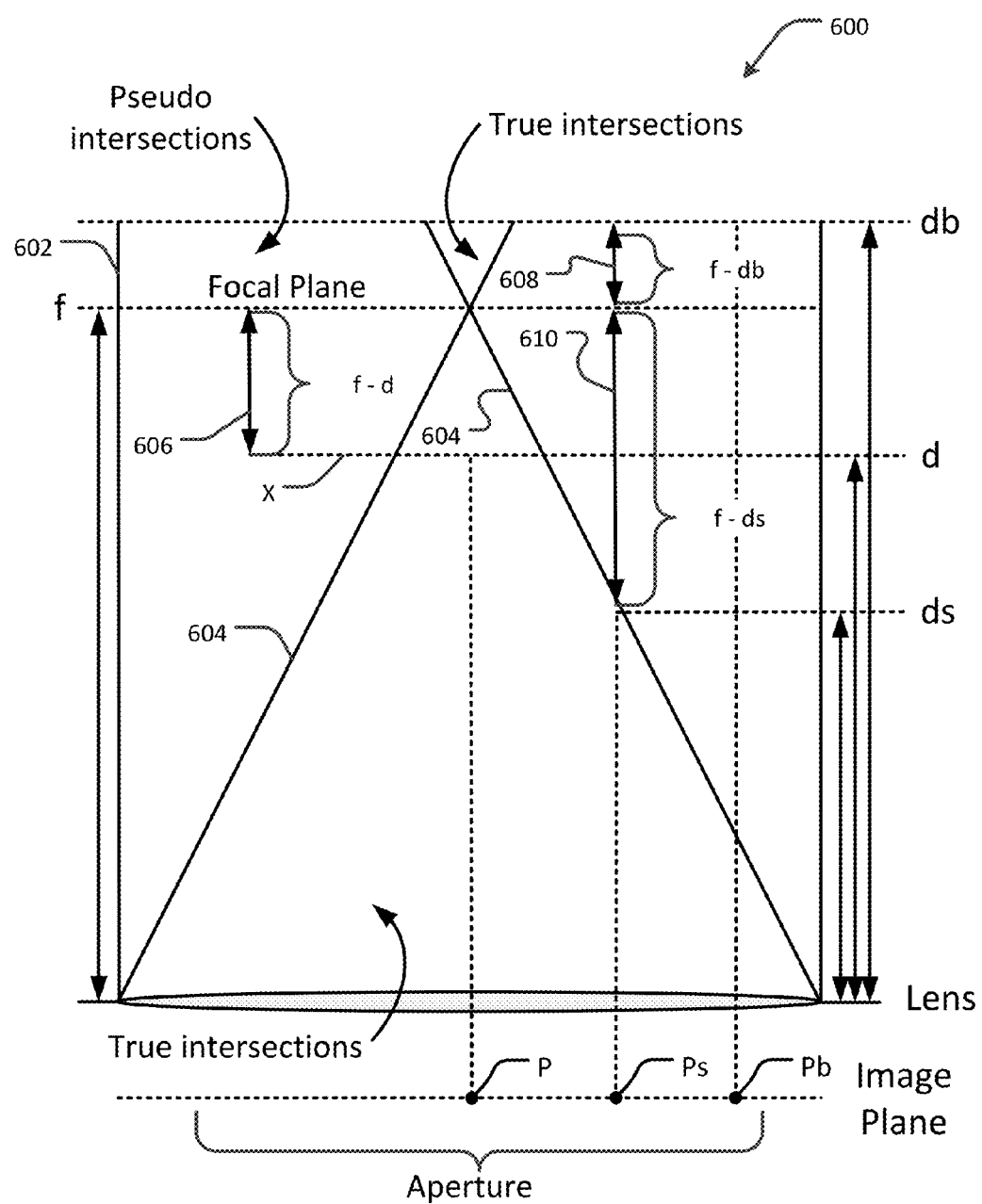
Figure 7:
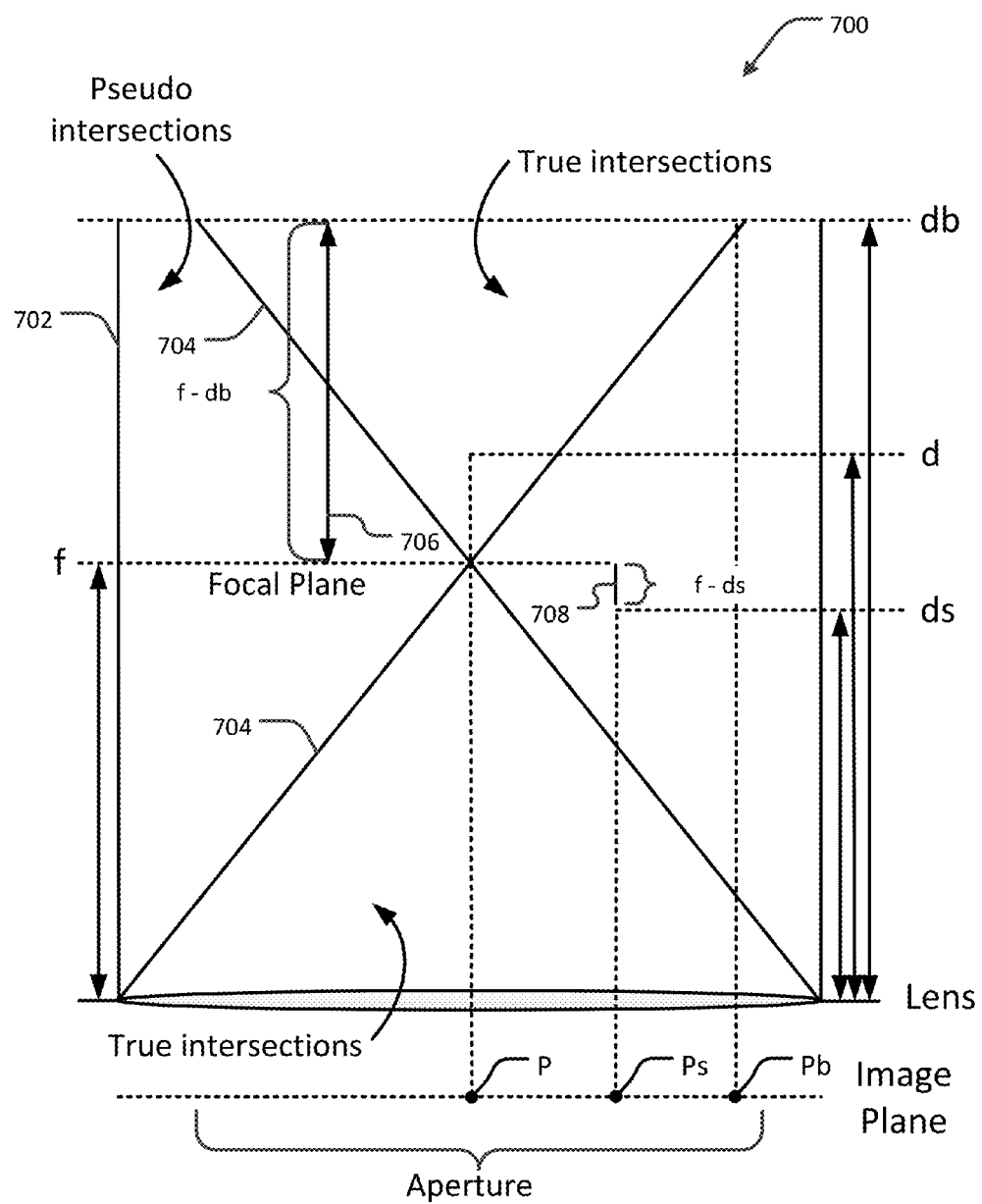

FIGS. 5, 6 and 7 are example ray tracing diagrams 500, 600, 700 for various focal plane depth values, in accordance with an embodiment. In each figure, P denotes the central pixel of the aperture 302 (such as shown in FIG. 4). The scene depth of an object appearing in pixel P is d, which occurs at a pseudo-intersection between the object and a ray perpendicular to the image plane. Ps denotes a target pixel (e.g., pixel 312 of FIG. 4) within the aperture 302 that has a depth ds, which is less than d, at a pseudo-intersection between the object and a ray traced from Ps perpendicular to the image plane. Pb denotes a different target pixel (e.g., pixel 318 of FIG. 4) in the aperture 302 having a depth db, which is greater than d, at a pseudo-intersection between the object and a ray traced from Pb perpendicular to the image plane.

In FIG. 5, the focal depth f is the same as the depth of P. Therefore, pixel P is in focus. Furthermore, the lens is focused in front of Pb and behind Ps. In this case, target pixel Pb is not sampled. Instead, P is sampled for Pb. Pseudo-intersections of perpendicular rays within the scene lie within a cylinder 502, and true intersections of approximated rays lie within a cone 504. Ps is sampled by computing the true offset 316 within the aperture 302 based on the depth difference between f and ds, indicated at 506. Thus, the sampled pixel 314 is offset from the target pixel 312 along the radius of the kernel 300 by a distance of (f−ds)R.

In FIG. 6, the focal depth f is greater than the depth of P. Therefore, the lens is focused behind P. Pseudo-intersections of perpendicular rays within the scene lie within a cylinder 602, and true intersections of approximated rays lie within a cone 604. In this case, target pixel Pb is sampled based on the depth difference between f and d, indicated at 606, or the depth difference between f and db, indicated at 608, whichever is greater. This is because if (f−d)>(f−db), and (f−db) is used to compute the new kernel, the output image may exhibit boundary discontinuities due to the sudden change of kernel size along the edge. Thus, for Pb, the sampled pixel 320 is offset from the target pixel 318 along a radius of the kernel 300 by a distance of (f−db)R or (f−d)R, whichever is greater. Ps is sampled by computing the true offset 316 within the aperture 302 based on the depth difference between f and ds, indicated at 610. Thus, for Ps, the sampled pixel 314 is offset from the target pixel 312 along a radius of the kernel 300 by a distance of (f−ds)R.

In FIG. 7, the focal depth f is less than the depth of P. Therefore, the lens is focused in front of P. Pseudo-intersections of perpendicular rays within the scene lie within a cylinder 702, and true intersections of approximated rays lie within a cone 704. In this case, target pixel Pb is sampled based on the depth difference between f and db, indicated at 706, because (f−db) will always be greater than (f−d). Thus, for Pb, the sampled pixel 320 is offset from the target pixel 318 along a radius of the kernel 300 by a distance of (f−db)R. Ps is sampled by computing the true offset 316 within the aperture 302 based on the depth difference between f and ds, indicated at 708. Thus, for Ps, the sampled pixel 314 is offset from the target pixel 312 along a radius of the kernel 300 by a distance of (f−ds)R.

Example Depth of Field Effect Solutions

Figure 8:
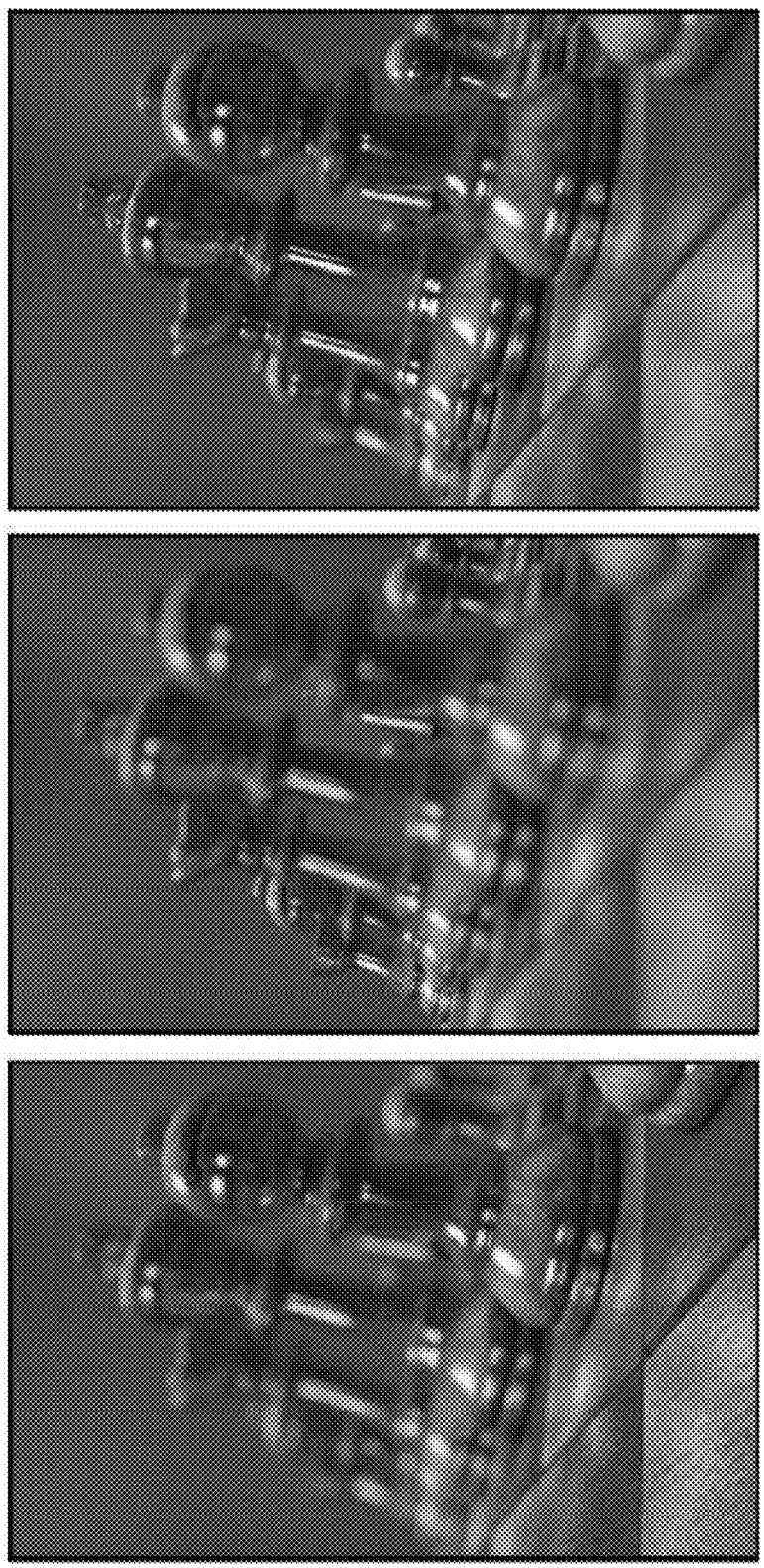
FIGS. 8A, 8B and 8C show several example digital output images, in accordance with various embodiments of the present invention.

FIGS. 8A, 8B and 8C show several example digital output images, in accordance with various embodiments. Each output image is based on the example digital input image 120 and depth map 122 of FIG. 1. Each of these output images has depth of field effects synthesized using techniques variously described in this disclosure, such as the methodology described with respect to FIG. 9. FIG. 8A shows an example digital output image where the depth of field focus (focal depth) is located near the front of the scene. FIG. 8B shows an example digital output image where the focus is located near the back of the scene. FIG. 8C shows an example digital output image where the focus is located near the center of the scene.

Example Methodologies

Figure 9:
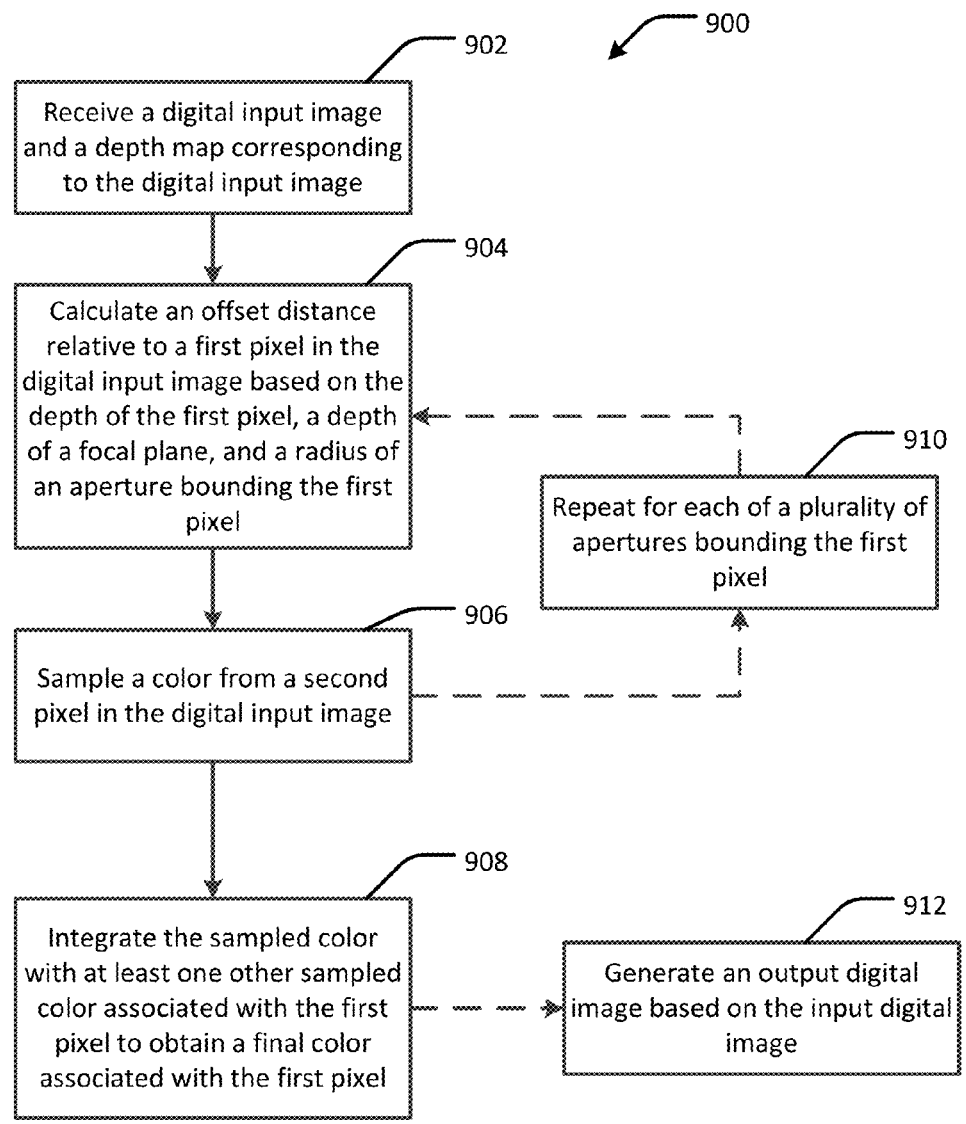
FIG. 9 is a flow diagram of an example methodology for synthesizing depth of field effects in a digital image, in accordance with an embodiment of the present invention.

FIG. 9 is a flow diagram of an example methodology 900 for depth of field synthesis in a digital image, in accordance with an embodiment. The example methodology 900 or portions thereof may, for example, be implemented by the system 100 of FIG. 1, including the image processor 110. The method 900 begins by receiving 902 a digital input image having a plurality of pixels and a depth map corresponding to the digital input image. The depth map represents a depth of each pixel in the digital input image. To compute the color of each pixel on the first image, a pseudo-intersection is determined by sampling all the pixels within the assigned kernel. The method 900 continues by calculating 904 an offset distance relative to a first pixel in the kernel based on the depth of the first pixel and a depth of a focal plane. The method 900 continues by sampling 906 a color from at least one second pixel in the kernel. Each second pixel is offset from the first pixel along the radius of the aperture by the offset distance. In some embodiments, the offset distance is a function of a difference between the depth of the focal plane and the depth of the first pixel. In some such cases, the aperture is centered about a reference pixel in the digital input image, and the depth of the focal plane is less than a depth of the reference pixel. In some other cases, the aperture is centered about a reference pixel in the digital input image, the depth of the focal plane and the depth of the first pixel are both greater than a depth of the reference pixel. In such cases, the offset distance is a function of the greater of a difference between the depth of the focal plane and the depth of the first pixel, and the depth of the focal plane and the depth of the reference pixel. In yet other cases, the aperture is centered about a reference pixel in the digital input image, the depth of the focal plane is the same as a depth of the reference pixel, and the depth of the first pixel is greater than a depth of the reference pixel. In such cases, the respective second pixel is the reference pixel. The method 900 continues by integrating the sampled colors to obtain a final color associated with the first pixel.

In some embodiments, the method 900 includes repeating 910 the calculating 904 of the offset distance and the color sampling 906 for each of a plurality of apertures bounding the first pixel, where each aperture is centered about a different pixel in the digital input image. In some embodiments, the depth of the first pixel is normalized to a first value between 0 and 1, and wherein the depth of the focal plane is normalized to a second value between 0 and 1. In some embodiments, the method 900 includes generating 912 an output digital image based on the input digital image, where the output digital image includes a third pixel corresponding to the first pixel of the input digital image. The third pixel has the final color associated with the first pixel.

Example Computing Device

Figure 10:
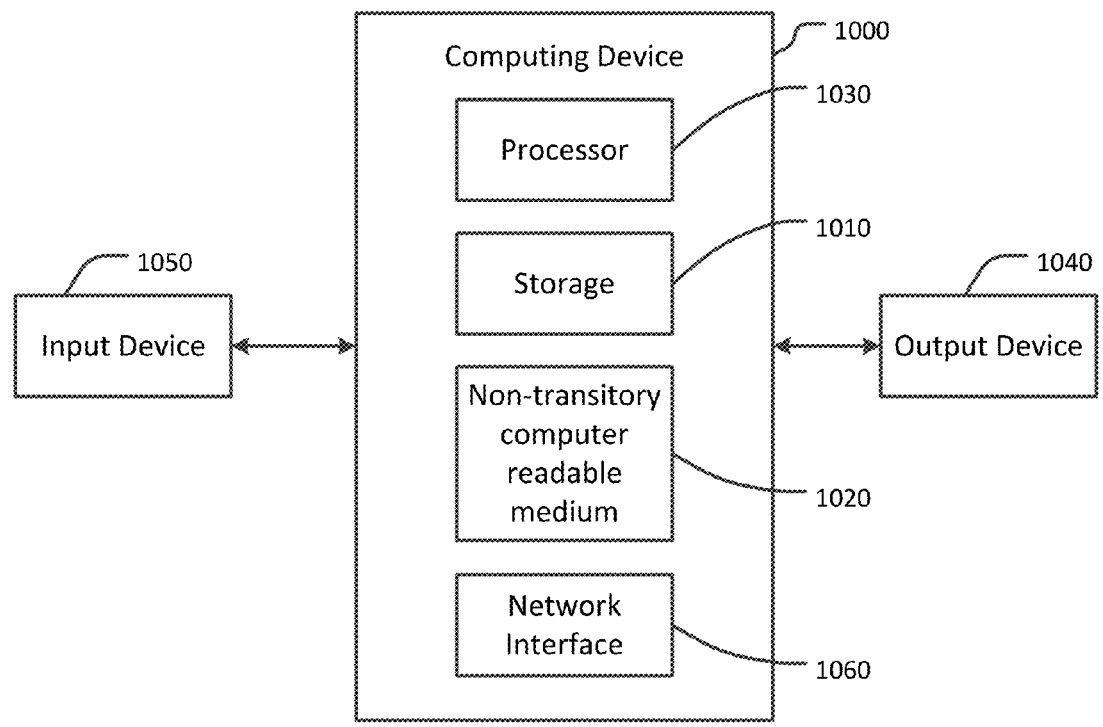
FIG. 10 is a block diagram representing an example computing device that may be used in accordance with an embodiment of the present invention.

FIG. 10 is a block diagram representing an example computing device 1000 that may be used to perform any of the techniques as variously described in this disclosure. For example, the system 100 may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the image processor 110, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 100, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving a digital input image comprising a plurality of pixels; receiving a depth map corresponding to the digital input image, the depth map representing a depth of each pixel in the digital input image; calculating an offset distance relative to a first pixel in the digital input image based on the depth of the first pixel, a depth of a focal plane, and a radius of an aperture bounding the first pixel; sampling a color from each of a plurality of second pixels in the aperture, the second pixel being offset from the first pixel along the radius of the aperture by the offset distance; and integrating the sampled colors to obtain a final color associated with the first pixel. In some cases, the process includes generating an output digital image based on the input digital image, where the output digital image includes a third pixel corresponding to the first pixel of the input digital image, the third pixel having the final color associated with the first pixel. In some cases, the process includes repeating the calculating and the sampling for each of a plurality of apertures bounding the first pixel, each aperture being centered about a different pixel in the digital input image. In some cases, the offset distance is a function of a difference between the depth of the focal plane and the depth of the first pixel. In some such cases, the aperture is centered about a reference pixel in the digital input image, and the depth of the focal plane is less than a depth of the reference pixel. In some cases, the aperture is centered about a reference pixel in the digital input image, the depth of the focal plane and the depth of the first pixel are both greater than a depth of the reference pixel, and the offset distance is a function of the greater of a difference between the depth of the focal plane and the depth of the first pixel, and the depth of the focal plane and the depth of the reference pixel. In some cases, the aperture is centered about a reference pixel in the digital input image, the depth of the focal plane is the same as a depth of the reference pixel, the depth of the first pixel is greater than a depth of the reference pixel, and the second pixel is the reference pixel. In some cases, the depth of the first pixel is normalized to a first value between 0 and 1, and the depth of the focal plane is normalized to a second value between 0 and 1. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
   receiving a digital input image comprising a plurality of pixels representing an image of an object;
   receiving a depth map corresponding to the digital input image, the depth map representing a depth of each pixel in the digital input image, the depth of each pixel being a distance between a lens of a camera that generated the digital input image and a point on a surface of the object;
   calculating an offset distance as a difference between the depth of a first pixel in the digital input image and a depth of a focal plane, the first pixel being bounded by an aperture centered about a reference pixel, the first pixel being different from the reference pixel;
   sampling a color from a second pixel in the aperture, the second pixel being offset from the first pixel along a radius of the aperture such that a distance along the radius between the first pixel and the second pixel is the same as the offset distance between the depth of the first pixel and the depth of the focal plane;
   integrating the sampled color with at least one color sampled from another pixel to obtain a final color associated with the first pixel; and
   causing a display of an output image via a display device, the output image including the final color associated with the first pixel.

2. The method of claim 1, wherein the output digital image comprises a third pixel corresponding to the first pixel of the input digital image, the third pixel having the final color associated with the first pixel.

3. The method of claim 1, further comprising repeating the calculating and the sampling for each of a plurality of apertures bounding the first pixel, each aperture being centered about a different pixel in the digital input image.

4. The method of claim 1, wherein the offset distance is a function of a difference between the depth of the focal plane and the depth of the first pixel.

5. The method of claim 4, wherein the depth of the focal plane is less than a depth of the reference pixel.

6. The method of claim 1, wherein the depth of the focal plane and the depth of the first pixel are both greater than a depth of the reference pixel, and wherein the offset distance is a function of the greater of a difference between the depth of the focal plane and the depth of the first pixel, and the depth of the focal plane and the depth of the reference pixel.

7. The method of claim 1, wherein the depth of the focal plane is the same as a depth of the reference pixel, wherein the depth of the first pixel is greater than a depth of the reference pixel, and wherein the second pixel is the reference pixel.

8. The method of claim 1, wherein the depth of the first pixel is normalized to a first value between 0 and 1, and wherein the depth of the focal plane is normalized to a second value between 0 and 1.

9. A system comprising:
   a storage; and
   a processor operatively coupled to the storage, the processor configured to execute instructions stored in the storage that when executed cause the processor to carry out a process comprising:
   receiving a digital input image comprising a plurality of pixels representing an image of an object;
   receiving a depth map corresponding to the digital input image, the depth map representing a depth of each pixel in the digital input image, the depth of each pixel being a distance between a lens of a camera that generated the digital input image and a point on a surface of the object;
   calculating an offset distance as a difference between the depth of a first pixel in the digital input image and a depth of a focal plane, the first pixel being bounded by an aperture centered about a reference pixel, the first pixel being different from the reference pixel;
   sampling a color from a second pixel in the aperture, the second pixel being offset from the first pixel along a radius of the aperture such that a distance along the radius between the first pixel and the second pixel is the same as the offset distance between the depth of the first pixel and the depth of the focal plane;
   integrating the sampled color with at least one color sampled from another pixel to obtain a final color associated with the first pixel; and
   causing a display of an output image via a display device, the output image including the final color associated with the first pixel.

10. The system of claim 9, wherein the output digital image comprises a third pixel corresponding to the first pixel of the input digital image, the third pixel having the final color associated with the first pixel.

11. The system of claim 9, wherein the process further comprises repeating the calculating and the sampling for each of a plurality of apertures bounding the first pixel, each aperture being centered about a different pixel in the digital input image.

12. The system of claim 9, wherein the offset distance is a function of a difference between the depth of the focal plane and the depth of the first pixel.

13. The system of claim 12, wherein the depth of the focal plane is less than a depth of the reference pixel.

14. The system of claim 9, wherein the depth of the focal plane and the depth of the first pixel are both greater than a depth of the reference pixel, and wherein the offset distance is a function of the greater of a difference between the depth of the focal plane and the depth of the first pixel, and the depth of the focal plane and the depth of the reference pixel.

15. The system of claim 9, wherein the depth of the focal plane is the same as a depth of the reference pixel, wherein the depth of the first pixel is greater than a depth of the reference pixel, and wherein the second pixel is the reference pixel.

16. The system of claim 9, wherein the depth of the first pixel is normalized to a first value between 0 and 1, and wherein the depth of the focal plane is normalized to a second value between 0 and 1.

17. A non-transitory computer program product having machine-readable instructions encoded thereon that when executed by one or more processors cause a process to be carried out, the process comprising:
- receiving a digital input image comprising a plurality of pixels representing an image of an object;
- receiving a depth map corresponding to the digital input image, the depth map representing a depth of each pixel in the digital input image, the depth of each pixel being a distance between a lens of a camera that generated the digital input image and a point on a surface of the object;
- calculating an offset distance as a difference between the depth of a first pixel in the digital input image and a depth of a focal plane, the first pixel being bounded by an aperture centered about a reference pixel, the first pixel being different from the reference pixel;
- sampling a color from a second pixel in the aperture, the second pixel being offset from the first pixel along a radius of the aperture such that a distance along the radius between the first pixel and the second pixel is the same as the offset distance between the depth of the first pixel and the depth of the focal plane;
- integrating the sampled color with at least one color sampled from another pixel to obtain a final color associated with the first pixel; and
- causing a display of an output image via a display device, the output image including the final color associated with the first pixel.

18. The non-transitory computer program product of claim 17, wherein the output digital image comprises a third pixel corresponding to the first pixel of the input digital image, the third pixel having the final color associated with the first pixel.

19. The non-transitory computer program product of claim 17, wherein the process further comprises repeating the calculating and the sampling for each of a plurality of apertures bounding the first pixel, each aperture being centered about a different pixel in the digital input image.

20. The non-transitory computer program product of claim 17, wherein the offset distance is a function of a difference between the depth of the focal plane and the depth of the first pixel.

* * * * *